United States Patent [19]

Clausen et al.

[11] Patent Number: 4,993,806
[45] Date of Patent: Feb. 19, 1991

[54] REAR-PROJECTION SCREEN

[75] Inventors: Johannes Clausen, Charlottenlund; Erik Clausen, Gentofte, both of Denmark

[73] Assignee: Dai Nippon Printing Co., Ltd., Tokyo, Japan

[21] Appl. No.: 358,806

[22] Filed: May 31, 1989

[30] Foreign Application Priority Data

May 8, 1989 [DK] Denmark .............................. 2236/89

[51] Int. Cl.$^5$ ............................................. G03B 21/60
[52] U.S. Cl. .................................................... 350/128
[58] Field of Search ................................. 350/127–129

[56] References Cited

U.S. PATENT DOCUMENTS

| 4,418,986 | 12/1983 | Yata | 350/128 |
| 4,573,764 | 3/1986 | Bradley | 350/128 |
| 4,730,897 | 3/1988 | McKechnie et al. | 358/128 |
| 4,923,280 | 5/1990 | Clausen et al. | 350/128 |
| 4,927,233 | 5/1990 | Nakanishi et al. | 350/128 |
| 4,936,652 | 6/1990 | Clausen et al. | 350/128 |

FOREIGN PATENT DOCUMENTS 0114395 11/1987 European Pat. Off.

Primary Examiner—Richard A. Wintercorn
Attorney, Agent, or Firm—Larson and Taylor

[57] ABSTRACT

A transparent rear-projection screen is described where the side facing the projectors has a lens surface for parallelling of the light, and where the front side has vertical upright forerunning lenses to upread the light in a horizontal plane, and where between these lenses there are grooves with a light absorbing material to increase the contrast of the projected picture.

7 Claims, 5 Drawing Sheets

REAR-PROJECTION SCREEN

FIELD OF THE INVENTION

The present invention covers a rear-projection screen, which on the side facing the viewer had vertical upright forerunning lenses, and where between each pair of lenses there are grooves, which are totally or partly filled with a material impenetrable to light, e.g. of a black colour, to increase the contrast.

BACKGROUND OF THE INVENTION

Rear projection screens have widely been utilized for video projection TV sets, micro film readers, computers and flight simulators.

From the descriptions in U.S. Pat. No. 4,573,764 and U.S. Pat. No. 4,418,986, and European application No. 0114395 rear-projection screens with vertical upright forerunning convex lenses on the front side in the screen's user position, and where between the convex lenses there are grooves, in which a material impenetrable to light is applied, are known.

In U.S. Pat. No. 4,573,764 the grooves between the lens tops are filled e.g. with coal dust particles, so that the tilted sides of the grooves are totally reflective to light beams from the projectors. The coal particles are then sealed with a lacquered film.

In U.S. Pat. No. 4,418,986 a total or partly reflecting surface is applied to the tilted side between the lens tape, upon which a material impenetrable to light is applied, e.g. black colour.

In the European application No. 0114395, the V-shaped groove between the two total reflecting sides is masked off with a body in a circular cross section, which has by and large the same diameter as the opening of the V-shaped groove or alternatively an inside back paper is applied to the total reflecting sides and filled with the black colour, where the above-mentioned body with the circular cross section is placed in the V-opening.

The principal difference between the present invention and the above-mentioned patents is that this invention does not have total reflecting sides or inside back paper applied to the sides of the grooves.

SUMMARY OF THE INVENTION

It is known to generate a projected TV picture by directing three projectors, each with their basic colour (red, green and blue), towards a transparent projection screen. Generally the three projectors are placed next to each other horizontally, and the enlarged picture to appear is facing the transparent screen. As the three projectors are placed next to each other, their optical axes form mutual angles. Often the optical axes form angles with each other from 7° up to 12°, dependent on the size of the picture tube and the distance from the picture tube up to the transmission screen.

Most designers of projection TV place the green picture tube between the red and the blue tube, so that the optical axis of the green picture is being projected perpendicularly onto the transmitting screen. This implies that the optical axes of the blue and the red picture tubes deviate by e.g. 9° in comparison to the optical axis of the green picture tube.

If, on the TV concerned, a plain mat screen is applied, an observer watching the screen slantwise from the front will see a picture which is either blue or green dominant, depending on whether the observer is closer to the optical axis for the projector giving a red or a blue picture ("colour shadow").

It is the purpose of the present invention to increase the contrast in the screen, compared to the known types of screens, by avoiding internal reflections in the screen by means of T-shaped grooves between the lens pairs.

A screen of the above-mentioned type may consist of a number of vertical upright forerunning lenses spreading the light horizontally, and where between these lenses there are grooves which can totally or partly be filled with a material absorbing the light.

BRIEF DESCRIPTION OF THE DRAWINGS

The invention is explained more in detail with reference to the figures, where.

DETAILED DESCRIPTION OF THE PREFERRED EMBODIMENTS

Figure 1:
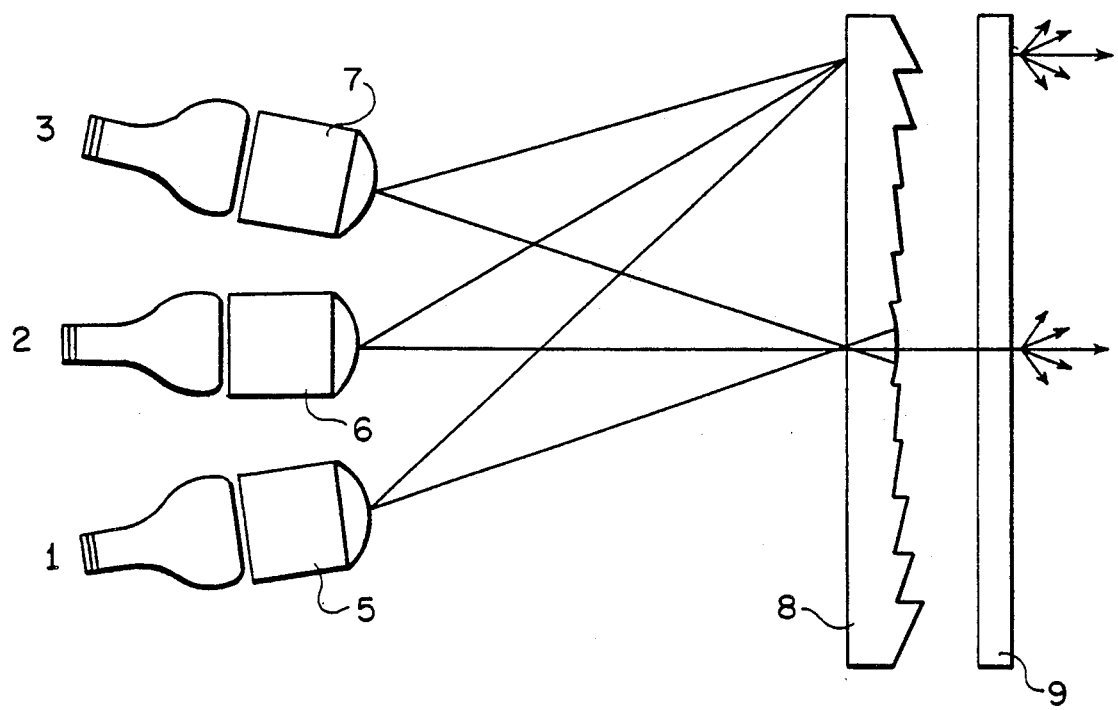
FIG. 1 shows a picture of a rear-projection screen with a surface provided with lenses for illumination and application of projection screens of the type mentioned here.

FIG. 1 shows how the three projectors 1, 2 and 3 project TV-pictures towards the rear side of a projection screen, 8 and 9. Each projector emits green, red and blue light respectively. The three projectors are placed next to each other horizontally, so that projector 2, most often the green projector, has its optical axis perpendicular to the screen 8 and 9.

The optical axes of the projectors 1 and 3 often form an angle of 6°-10° to the optical axis of projector 2.

By means of the three projectors 1, 2 and 3, as well as the lenses 5, 6 and 7 mounted in front, it is possible to form—proportional to the projectors—an enlarged picture on the screen 8 and 9.

Figure 2:
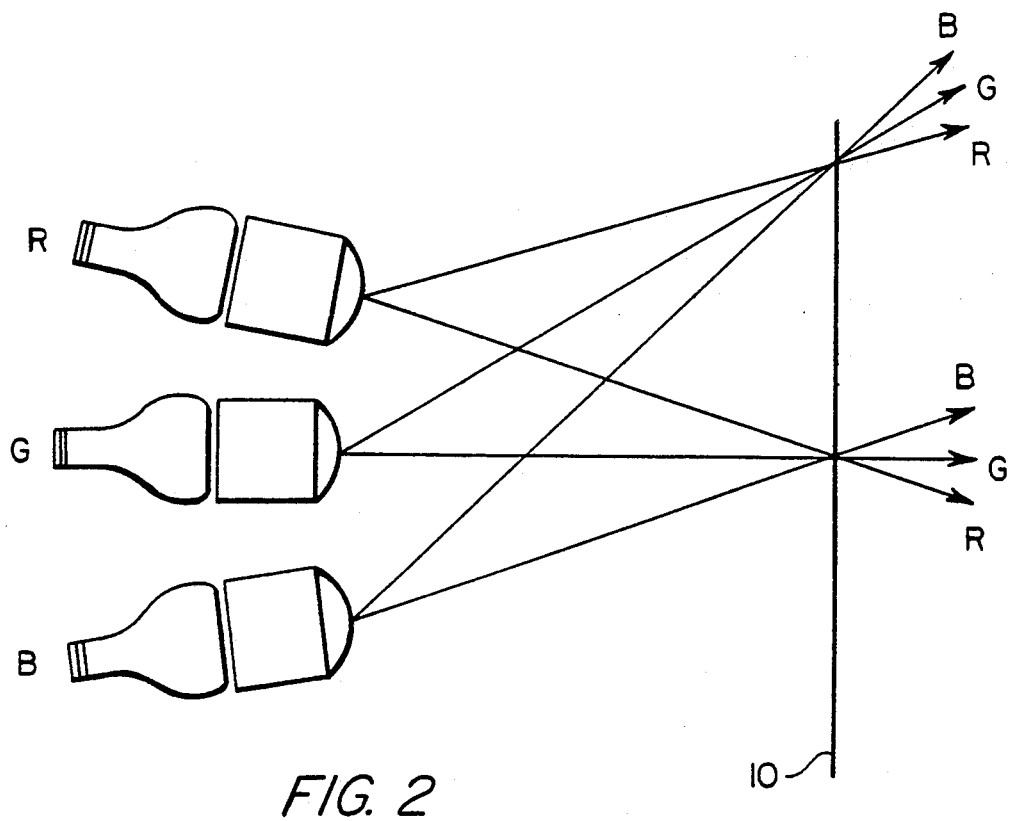
FIG. 2 shows a visually enhanced screen which may be a simple mat screen or micro film screen.

Screen 10 shown on FIG. 2 is a simple mat screen, e.g. mat glass or a micro film screen, without lenses in it. Standing to the right, or to the left of the screen's centre line where the optical axis of projector 2 perpendicular latersects the screen as viewed the observer will see a red or a blue dominating picture, depending on whether the observer is closer to the red or the blue projector's optical axis. An observer standing at the centre line of the screen will see the screen red dominating towards the right side, if the red projector's optical axis is to the right of the screen's centre line etc.

It is this colour impurity, to an observer watching the picture from the front, that this present invention is aimed at correcting.

Figure 3:
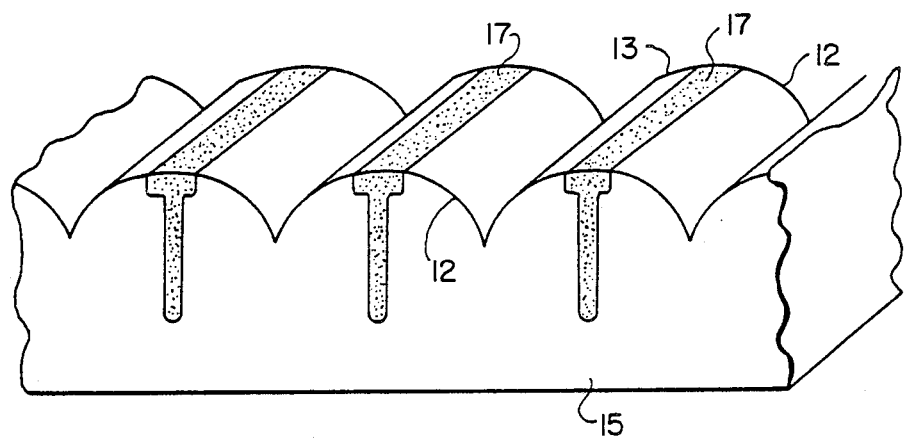
FIG. 3 shows a perspective cut of an embodiment for the screen, according to the invention.

FIG. 3 shows an embodiment in perspective for the screen according to the invention, where is indicates the screen's basic material, e.g. acrylic. The front side of the screen is provided with pairs of upright lenses, 12 and 13. By a lens pair is meant the two curved planes 12 and 13 facing each other and crossing each other at the descending point. The sides of each lens pair are limited by grooves 17 with light absorbing material.

Figure 4:
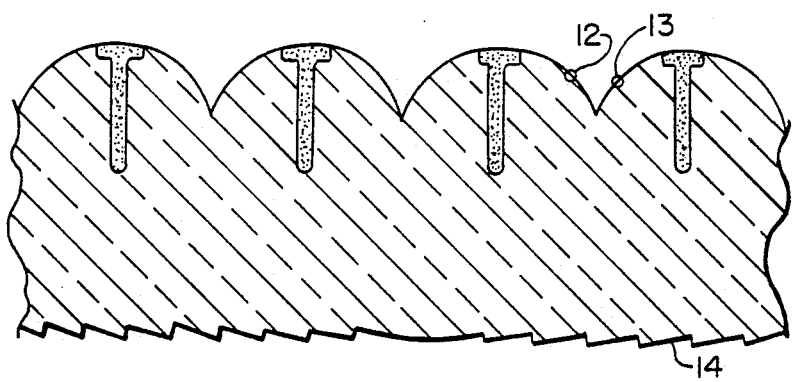
FIG. 4 shows a cross-sectional view one more embodiment in which a Fresnel lens is designed on the projection surface of the rear-projection screen shown in FIG. 3, FIG. 5 and FIG. 6 show a cross-sectional view of a known screen construction.

FIG. 4 shows an embodiment where the side, facing the projectors 1, 2 and 3, is designed as a Fresnel lens 14 for paralleling of the light, so that the light strikes the front side normal to the surface.

Figure 7:
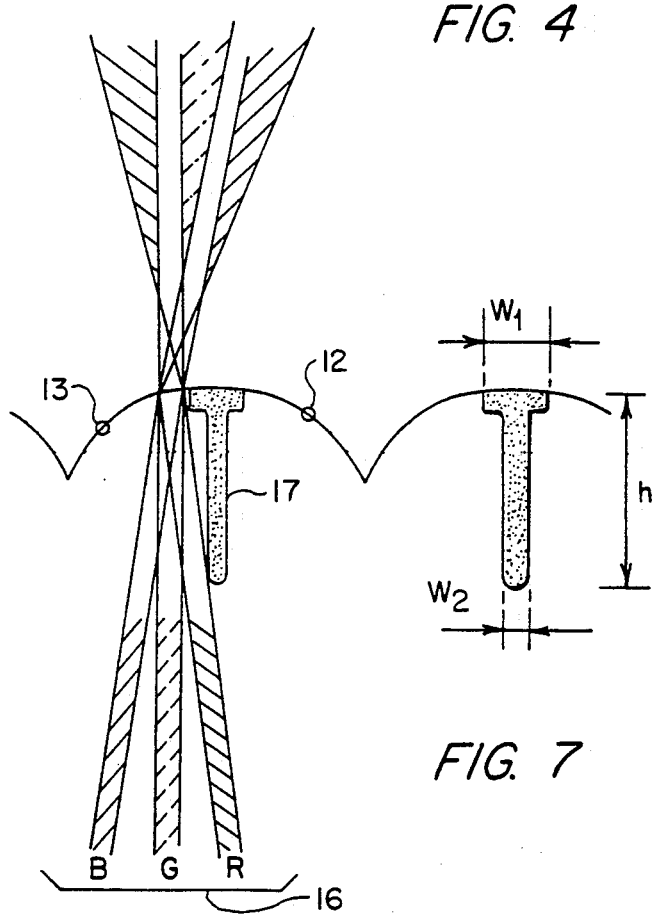
FIG. 7 shows a cross-sectional view of the screen according to the present invention.

In order to further explain the invention, a cross sectional view of the lenses 12 and 13 in FIG. 3 is shown in FIG. 7. In FIG. 7 the light beams 16 from the projectors strike lens 13, after which they are deflected. It will be seen that all three bundles of light can get past the T-shaped light absorber 17.

Among experts it is known to add tint to mat screens in order to increase the contrast, but simultaneously with this increase of the contrast, the light from the projectors to the observer is reduced proportionately. Most often this light transmission is noticeably reduced when a mixture of 40-50% tint is added.

It is the purpose of the present invention to reduce this loss by 10-20% and to avoid discoloration of the picture that would otherwise result from the addition of tint. The height n in FIG. 7 is very important to obtain the contrast improvement desired.

Figure 9:
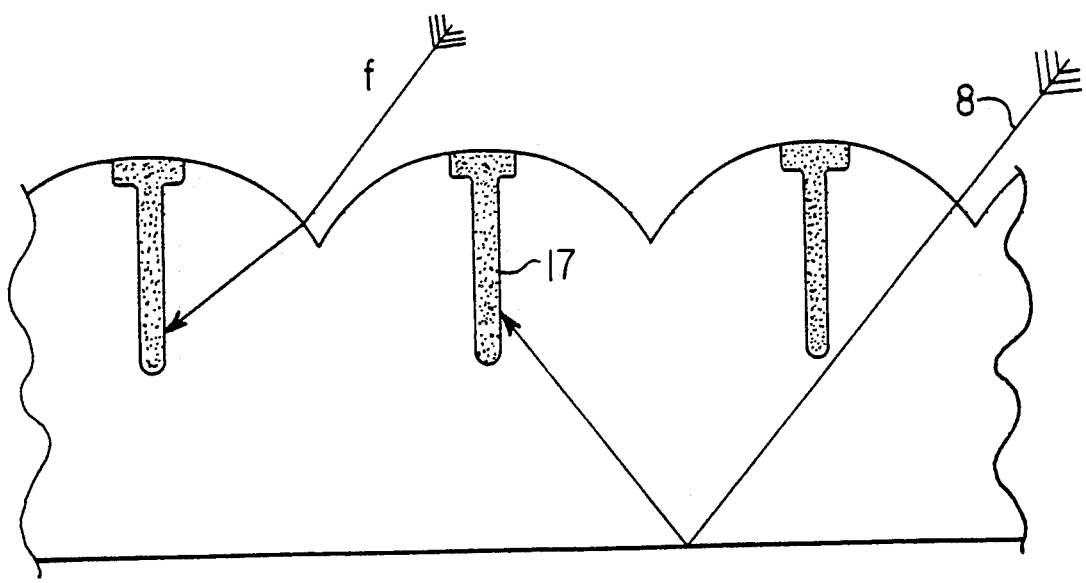
FIG. 9 is a diagram showing that the daylight beams are being absorbed by the T-shaped grooves.
Figure 10:
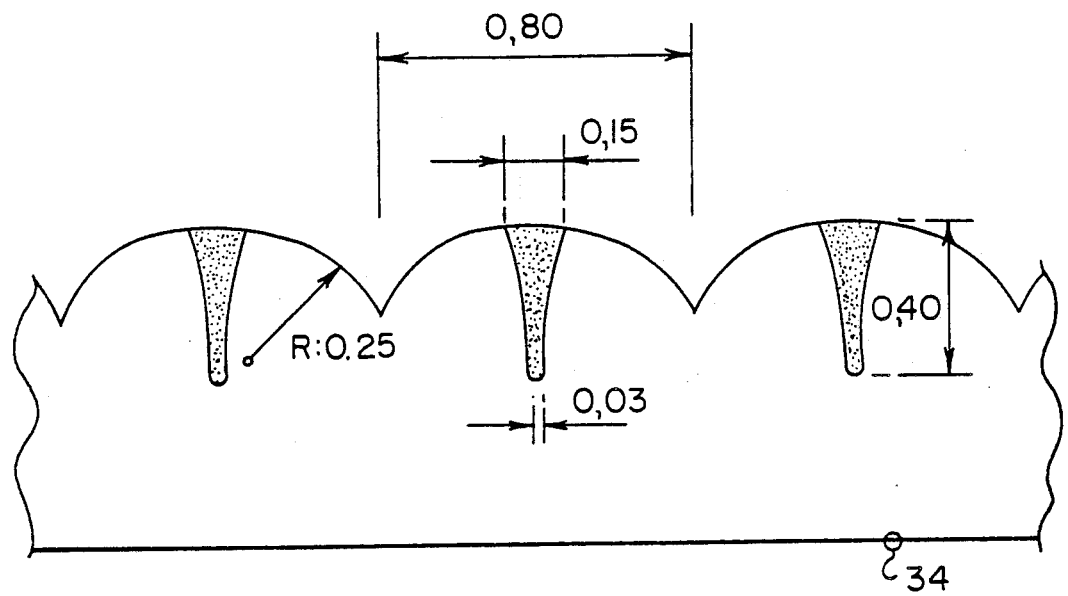
FIG. 10 and FIG. 11 show drawings corresponding to FIG. 7 for illustration of different altered embodiments of the screen according to the invention.

FIG. 9 shows how the light beams from the observer's side e and f penetrate the screen and are smothered by the T-shaped grooves 17.

Figure 5:
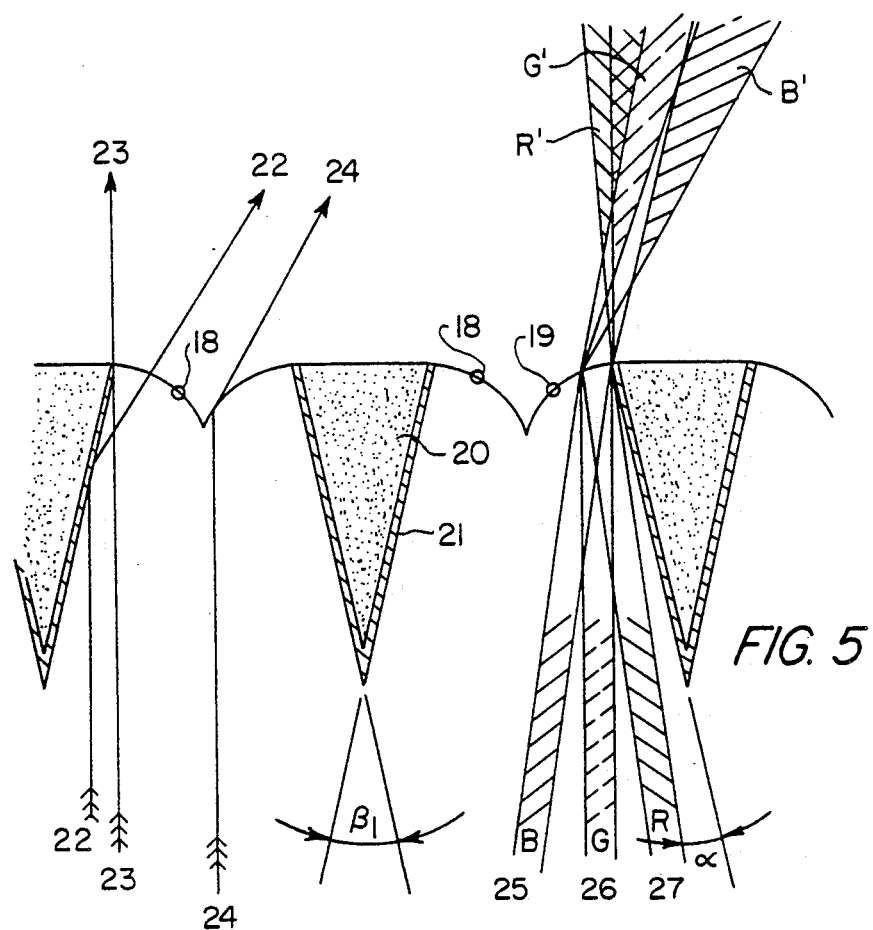
Figure 6:
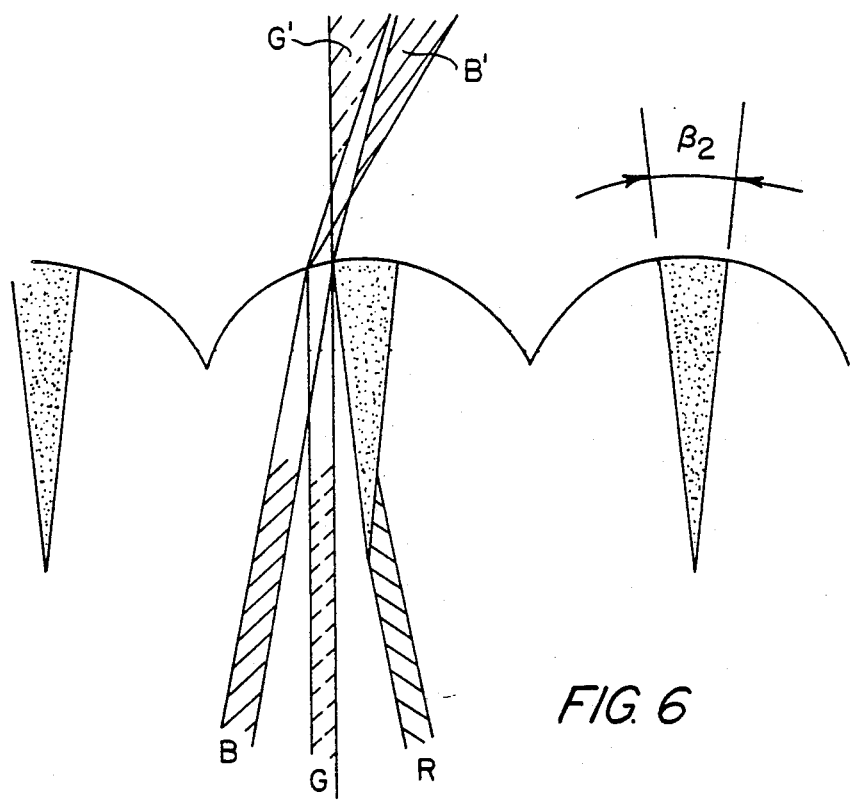

In order to comprehend the mode of operation of the light absorbing grooves, FIG. 5 and FIG. 6 show already known designs which will be explained more in detail below.

Figure 8:
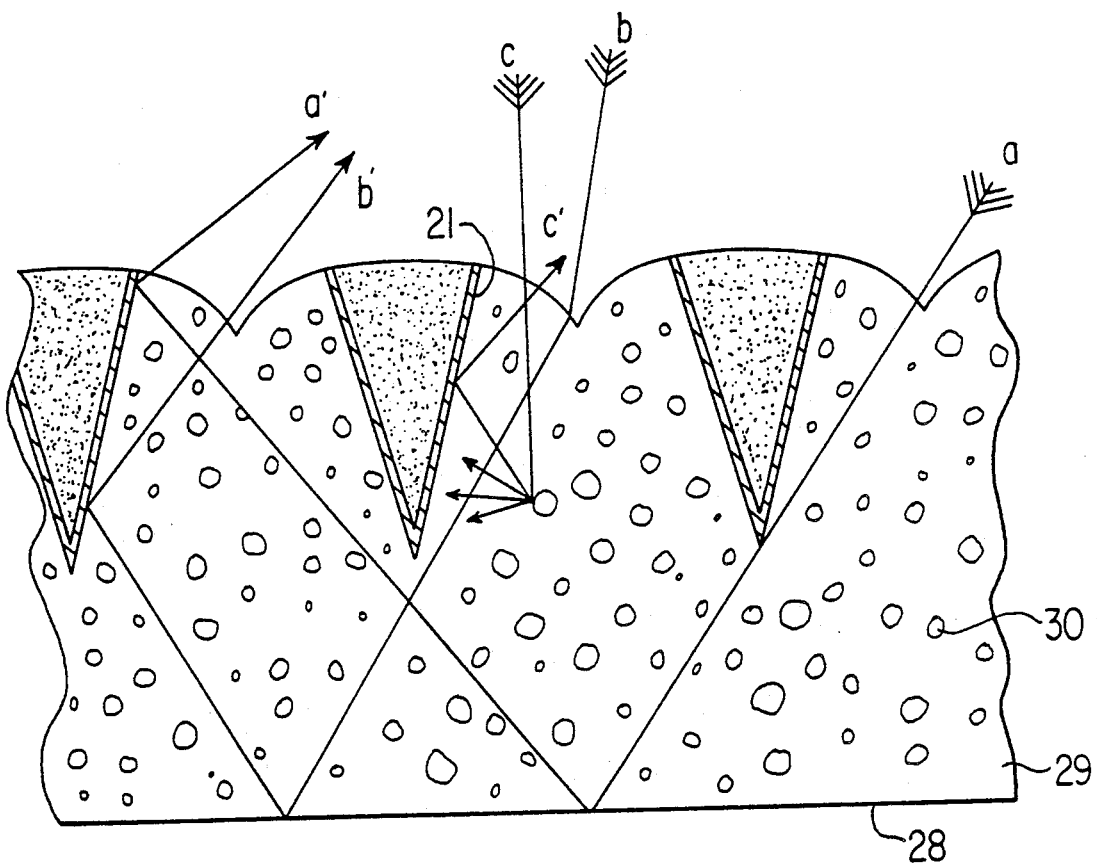
FIG. 8 shows reflections of room light from the screen illustrated in FIG. 5.

FIG. 5 shows a cross section of a known screen. It will be seen how the light beams 23 and 24 are reflected when they strike the lenses 18 and 19. The beam 22 is reflected from the inside back papered side 21, and then passes through lens 18. It will also be seen how the three light bundles 25, 26 and 27 from the blue, green and the red projectors respectively, pass through lens 19. The angle $\alpha$ has been made large enough for all light beams to pass directly through lens 18 and 19 or indirectly via the inside back papered surface 21. Unfortunate for this construction is that room light can penetrate into the screen via the lenses 18 and 19, and then via the surface on the backside of the screen reflect back to the observer. Thus the contrast will be reduced, as seen in FIG. 8. In order to overcome this problem and improve clarity the Fresnel 14, as shown in FIG. 4, are used to replace plane surface 28. (FIG. 8)

In FIG. 8, showing a cross sectional view of a known screen, it will be seen that the screen 29 contains glass particles 30 to spread the light in a vertical direction. The admixture of these particles reduces the contrast, as it may enable light from the room to reflect back to the observer. The light beam c, being spread by a glass particle, strikes the surface 21 of the inside back paper and then passes through lens 18 in direction of the observer $c_1$.

FIG. 6 shows an embodiment as in FIG. 5 but without the inside back paper coating. It will be seen that the light from the red light source is absorbed.

The following example illustrates the technical improvement achieved.

EXAMPLE 1

Figure 11:
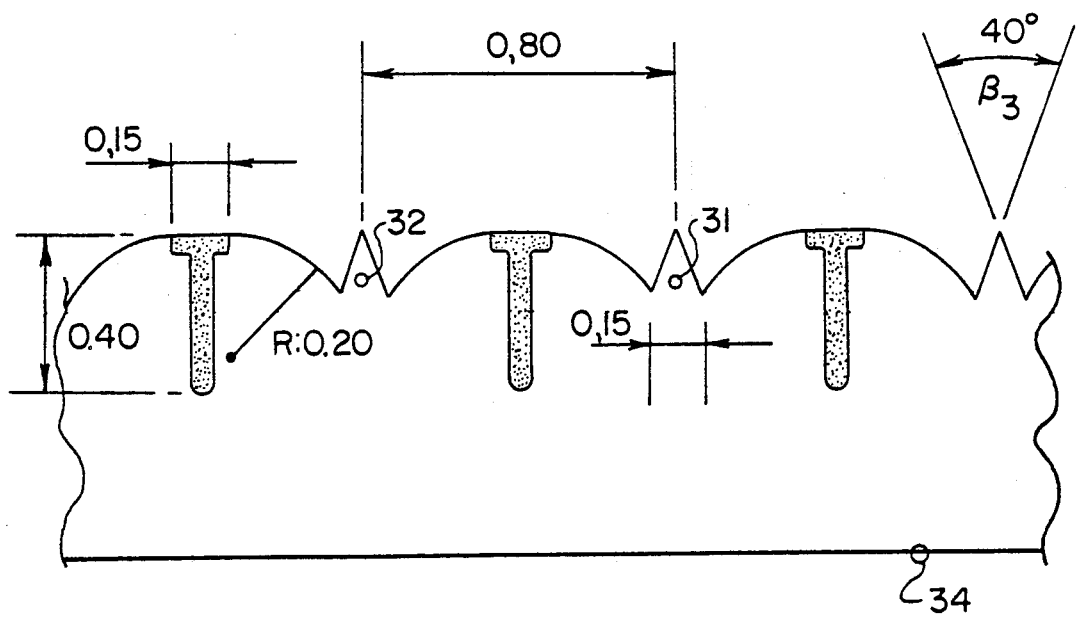

With a screen mould of the design shown in FIG. 11, a 3 mm thick sheet of PMMA with an admixture of 18 gr. $SiO_2/m^2$ is casted (grain size 5-35 $\mu$m). The partition between the lens tops 31 and 32 was 0.8 mm. The top angle for the lenses 31 and 32 $\beta_3$ was 40°. The width of black absorption material at the base of the T-shaped groove $W_1=0.15$, the depth $h=0.30$. Radius for lenses 18 and 19, $r=0.20$ mm.

When the mould was filled, it was placed horizontally with the lenses 18 and 18 facing downwards. By doing so the refractive powder was sedimented, so that it settled in a well-defined layer by the surface of the lenses 18 and 19 with a thickness of approx. 100 $\mu$m. When the screen was removed from the mould, PVA (polyvenylalcohol) was applied to the lens tops 18 and 19. The entire surface was then lacquered with black colour. After proper drying the PVA-film was removed from the lenses 18 and 19.

The screen now showed the following parameters:
Peak gain: 6.2
½ horizontal: 32°
½ vertical: 8°

Peak gain means the directly transparent light measured as normal to the surface in comparison to known references.

Contrast conditions were measured with the TV was switched off and the screen lit with a 500 w quartz-halogen lamp (The measured results are the mean value for the light source, with the light meter placed at different angles as compared to the screen's normal).

| Screen acc to ex 1 | | Screen acc to FIG. 5 | | Known screen w/tint and glass powder | |
|---|---|---|---|---|---|
| Screen | White ref | Screen | White ref | Screen | White ref |
| 14 | 72 | 25 | 73 | 30 | 70 |

Contrast conditions were also measured with the TV turned on and a chess pattern over the entire picture surface (black/white) without room light:

The measurements showed a considerably better contrast on the screen according to the invention.

CONCLUSION

The screen showed a very high contrast and a good efficiency so that the picture was visible within a wide viewing angle horizontally as well as vertically and without discoloration of the picture.

We claim:

1. A transparent rear-projection screen having a front side and a rear side, which on its rear side is provided with a lens surface for paralleling of light coming from behind, and which on its front side facing the viewer is provided with rectilinear lenses comprising a plurality of vertical lens pairs to spread the light in a horizontal plane, wherein between the vertical lens pairs there are light absorbing grooves, which are at least partly filled with a light absorbing material, the side surfaces of each of said light absorbing groove being arranged relative to the screen such that incident light beams pass across said side surfaces without reflection.

2. A transparent rear-projection screen having a front side and a rear side, which on its rear side is provided with a lens surface for paralleling of light coming from behind, and which on its front side facing the viewer is provided with rectilinear lenses comprising a plurality of vertical lens pairs to spread the light in a horizontal plane, wherein between the vertical lens pairs there are light absorbing grooves, which are totally or partly filled with a light absorbing material, the grooves between the lens pairs being substantially T-shaped, with each groove having a depth h and a width $w_1$ wherein the depth h is at least as great as the width $w_1$.

3. A rear-projection screen according to claim 1, wherein the rear side of the screen is provided with a Fresnel lens for paralleling of the light coming from behind.

4. A rear-projection screen according to claim 2, wherein the rear side of the screen comprising a Fresnel part for paralleling of the light.

5. A rear-projection screen according to claim 1, wherein the screen contains refractive particles primarily located toward the front side of the screen.

6. A transparent rear-projection screen having a front side and a rear side, which on its rear side is provided with a lens surface for paralleling of light coming from behind, and which on its front side facing the viewer is provided with rectilinear lenses comprising a plurality of vertical lens pairs to spread the light in a horizontal plane, wherein between the vertical lens pairs there are light absorbing grooves, which are totally or partly filled with a light absorbing material, the front side of said screen being totally or partly matted in order to reduce the surrounding reflections.

7. A transparent rear-projection screen having a front side and a rear side, which on its rear side is provided with a lens surface for paralleling of light coming from behind, and which on its front side facing the viewer is provided with rectilinear lenses comprising a plurality of vertical lens pairs to spread the light in a horizontal plane, wherein between the vertical lens pairs there are light absorbing grooves, which are totally or partly filled with a light absorbing material, the rear side of the screen having a lens structure for spreading the light in a vertical direction.

* * * * *